United States Patent
Buck et al.

(10) Patent No.: US 8,621,782 B2
(45) Date of Patent: Jan. 7, 2014

(54) MECHANISM FOR AERATION AND HYDROPONIC GROWTH OF PLANT APPLICATIONS

(76) Inventors: Jeremiah Buck, Kiowa, CO (US); Steven Buck, Kiowa, CO (US)

(*) Notice: Subject to any disclaimer, the term of this patent is extended or adjusted under 35 U.S.C. 154(b) by 0 days.

(21) Appl. No.: 13/250,404

(22) Filed: Sep. 30, 2011

(65) Prior Publication Data
US 2013/0081327 A1    Apr. 4, 2013

(51) Int. Cl.
*A01G 31/00*    (2006.01)
(52) U.S. Cl.
USPC .................. 47/62 R; 47/58.1 CF; 47/66.7
(58) Field of Classification Search
USPC ..... 47/59 R, 62 R, 62 A, 65.5, 66.6, 66.7, 69, 47/79, 86, 39, 48.5, 58.1 R, 41.01, 44, 47, 47/58.1 CF, 82
See application file for complete search history.

(56) References Cited

U.S. PATENT DOCUMENTS

| | | | | |
|---|---|---|---|---|
| 2,198,150 A * | 4/1940 | Barnhart | ......... | 47/62 R |
| 4,057,930 A * | 11/1977 | Barham | ......... | 47/61 |
| 4,192,097 A * | 3/1980 | Smith | ......... | 47/59 R |
| 5,618,428 A * | 4/1997 | Oslund | ......... | 210/602 |
| 5,876,484 A * | 3/1999 | Raskin et al. | ......... | 47/62 R |
| 5,887,383 A * | 3/1999 | Soeda | ......... | 47/59 R |
| 6,233,870 B1 * | 5/2001 | Horibata | ......... | 47/62 R |
| 7,770,814 B2 * | 8/2010 | Archambeau et al. | ......... | 239/8 |
| 2003/0213170 A1 * | 11/2003 | Snead et al. | ......... | 47/62 A |
| 2009/0313894 A1 * | 12/2009 | Bieber | ......... | 47/62 R |

* cited by examiner

*Primary Examiner* — Rob Swiatek
*Assistant Examiner* — Lisa Tsang
(74) *Attorney, Agent, or Firm* — Blakely, Sokoloff, Taylor & Zafman LLP

(57) ABSTRACT

A method for hydroponical aeration of plants may include supplying, via an air pump, oxygenated air to a plant within a section of a plant vase that is part of a plant vessel. The section includes roots of the plant submerged in water. The method may further include evenly distributing, via an air diffuser, the oxygenated air to the roots of the plant to facilitate hydroponic growth of the plant.

20 Claims, 3 Drawing Sheets

MECHANISM FOR AERATION AND HYDROPONIC GROWTH OF PLANT APPLICATIONS

TECHNICAL FIELD

The embodiments of the invention relate generally to growth of plant-life and, more specifically, relate to providing an aeration and hydroponic growth mechanism for plant applications.

BACKGROUND

It is well-known that plants and flowers, etc., are often used to decorate various indoor and outdoor areas of rooms, homes, offices, public places (e.g., airports, etc.). There have been various designs put forth for planters, decorative vase center pieces, home gardening vessels with sophisticated grow lights, and nutrient distribution. For example, with regard to the "cut" flower industry, both the consumers and sellers (e.g., florists, nurseries, grocery stores, gift shops, etc.) share a limited shelf life or exposure time once the flower has been cut from the root source (of nutrition), providing merely a temporary visual enjoyment of the plant (usually at the peak of the plant's bloom cycle). It is understood that plants require a correct combinational environment of light, temperature, oxygen, nutrients, and water, etc., that are combined with attention and care, whereupon the plant continues to grow for a certain time period or life.

One major problem with traditional flower/plant vases is that they lack adequate air supply to provide adequate oxygen to the stem or roots of the flowers planted within the vases. It is well-known that without adequate oxygen, a plant cannot absorb the necessary nutritional requirements to extend or sustain life or achieve growth. Without a source of circulating oxygen, the water soon turns stagnate resulting in plant or flower subsequently dying.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

SUMMARY

Embodiments of the invention provide an aeration mechanism for hydroponical aeration and growth of plant applications are described. In accordance with the embodiments, there are provided methods, apparatus, and systems for hydroponical aeration of plants. In one embodiment, a method for hydroponical aeration of plants may include supplying, via an air pump, oxygenated air to a plant within a section of a plant vase that is part of a plant vessel. The section includes roots of the plant submerged in water. The method may further include evenly distributing, via an air diffuser, the oxygenated air to the roots of the plant to facilitate hydroponic growth of the plant.

DETAILED DESCRIPTION

Embodiments of the invention provide a plant vessel employing an aeration mechanism to provide oxygenated air through a technique of hydroponics to help plants within the vessel stay healthy without requiring a significant amount of attention. Further, the plant vessel offers improvements over mere water reservoirs that stagnate water and promotes bacterial growth that can significantly shortens the life span of plants, flowers (e.g., cut flowers), trees, aquatic water life, and other growing medium (collectively referred to herein as "plant(s)" or "plant application(s)").

In one embodiment, an aeration mechanism is provided to extend the life of plant applications, such as promoting potential propagation of certain species of flowers that the cuttings may root and continue their life cycle. Using aerating of water (through a technique of hydroponics (e.g., Aeroponics, Deep Water Culture, etc.) in a vase (or any vessel containing water for the purpose of sustaining or propagating flowers) and growing of plants including transplanting a living plant into the vessel. A plant vessel may be used for plant agriculture, home gardening, indoor/outdoor gardening, planter boxes, and flower vases, etc. Further, a plant vessel may include a pot, a planter box, a vase, etc., for the hydroponic propagation and production of plants, flowers, etc., according to one embodiment.

In one embodiment, an aeration mechanism is employed in a plant vessel to facilitate significant plant growth in the vessel having an air pump to sufficiently oxygenate the stem or root system of a plant application in the vessel for extended life, without using any soil, soil-less organic mixes, transplanted plants with soil or soil-less mix root balls, etc. The novel plant vessel is designed to promote growth and development of plant roots in a soil or soil-less growing medium mix.

Figure 1:
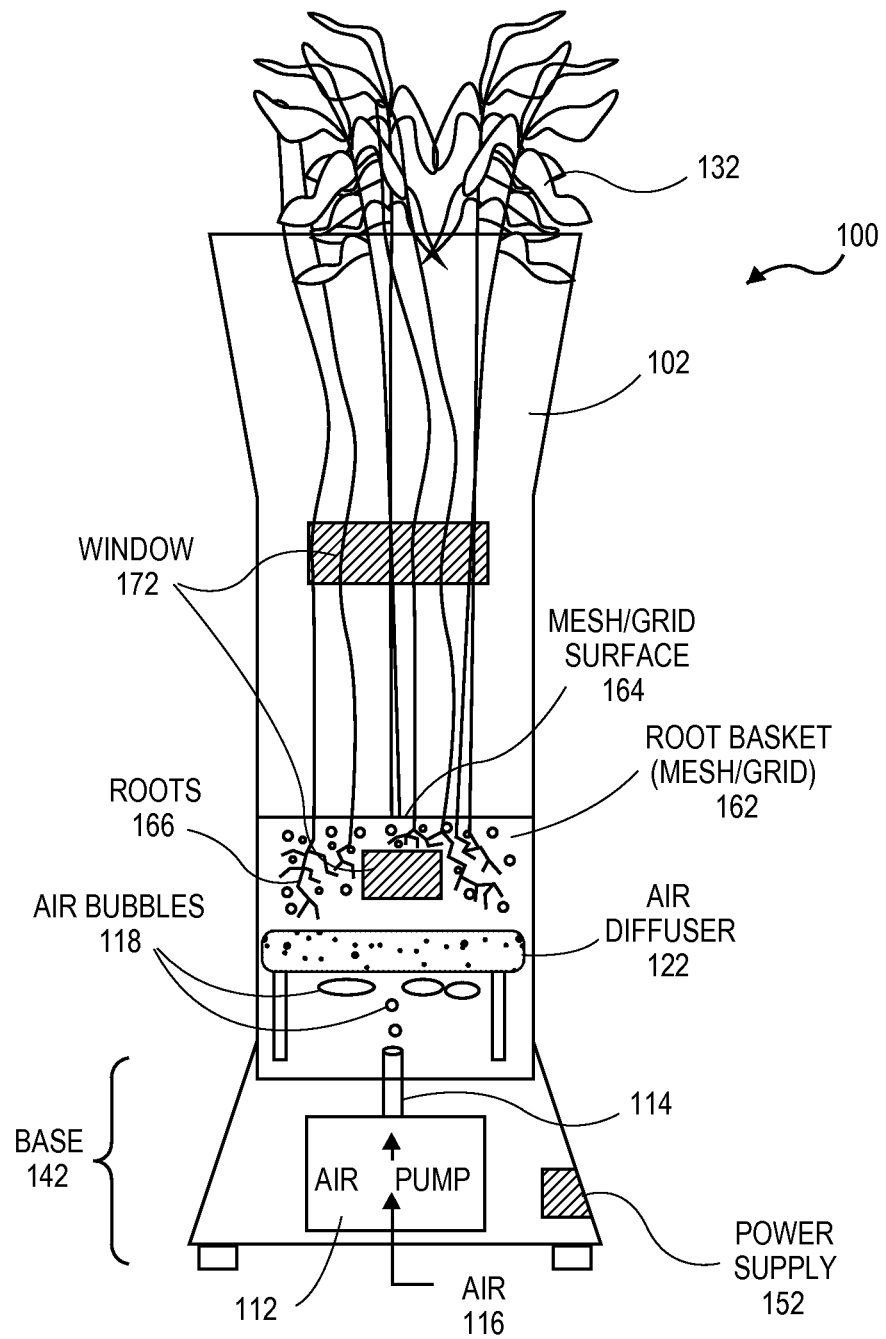
FIG. 1 illustrates a vessel employing an aeration mechanism for propagation and hydroponic growth of plant applications according to one embodiment of the invention.

FIG. 1 illustrates a vessel employing an aeration mechanism for propagation and hydroponic growth of plant applications according to one embodiment of the invention. As illustrated, a vessel 100 is shown to have a plant application growing in deep water culture. Deep water culture gives the plant application easy access to all the necessary nutrients and a healthy supply of oxygen for maximum growth as of the plant application. Deep water culture may include a form of hydroponics gardening technique in which plants are suspended above a nutrient solution in a net and the roots 166 of the plants are fully submerged in the nutrient-rich oxygenated water below. This aeration mechanism provides for a hydroponics system that can range in size from personal indoor gardens to commercial greenhouses and is beneficial to plant applications because it gives their roots 166 easy access to the necessary nutrients these plant applications need for maximum and healthy growth.

In one embodiment, the vessel 100 employs an embodiment of an aeration system or mechanism for various plant applications 132 including flowers, trees, aquatic water life, and other growing medium. One of the components of the vessel 100 includes an air pump 112 in the base 142 of the vessel 100. The air pump 112 plays a vital role in providing oxygenation through air 114 and circulation of oxygenated water to prevent stagnation of water and consequently, avoid bacterial growth in the water and an early termination of plants 132. This novel aeration mechanism of the vessel 100 is used to keep plant applications 132 (e.g., cut flowers) alive longer than those in other conventional vases by providing supply of oxygenated air 114, circulation of oxygenated water, and all those nutrients that are necessary for continuous growth of plant applications 132.

In one embodiment, the vessel 100 may be made of any number or combination of materials, such as glass, ceramic, steel, aluminum, etc. Further, the vessel 100 may come in any size or shape (e.g., the vase (or container) 102 and may hold any amount of water, such as any number of pints or quarts or gallons of water, etc., depending on the type of flowers or other plants it holds). In other words, the vessel 100, including the vase 102, is not limited to a particular construction material, size, or shape. For example, the vase 102 may be made of glass and be narrow or small enough to hold a single rose or constructed with steel and be wide or large enough (such as a planter box) to hold several household plants or even commercially-grown applications or greenhouse-based or retail florists-based flowers or plants, etc.

As illustrated, the base 142 of the vessel 100 may include an air pump 112 to pump air 116 into the vase 102 to keep the plants 132 properly oxygenated. As with the size and use of the vessel 100 and the vase 102 (e.g., holding a single flower or a large plant), the air pump 112 may also vary in size and performance, such as in terms of the rate of flow or capacity of pumped air into the vase 102 depending on the plant application 132. For example, an anti-siphon check valve may be made part of the air pump 112 to avoid any back flow of water if, for some reason, the air pump 112 fails. As illustrated, the air pump 112 may employ a pipe (or a tube-like opening) 114 to manage a proper flow of the air 116 into the vase 102.

In one embodiment, the vessel 100 further employs an air diffuser 122 to evenly diffuse the air bubbles 118 caused by the pumping of the air 116 by the air pump 112 so that the oxygenated air 118 can be property distributed throughout the water to oxygenate the water. In one embodiment, the air diffuser 122 may be a simple round plate with holes throughout the plate to, as aforementioned, evenly diffuse the air bubbles 118. In another embodiment, the air diffuser 122 may simply be an air stone (or hosing) with holes such as used in fish aquariums.

Furthermore, regarding power supply 152, in one embodiment, the vessel 100 may include a rechargeable cordless system (similar to the ones found in mobile phones, rechargeable electric razors, tablet computers, etc.) with a back-up battery-operated system (such as those found in toys, battery-operated razors, etc., that function on various types of batteries, AAA, AA, C, D, 9-volt, etc.). For example, the vessel 100 may be placed and charged up (using a wall outlet) on a kitchen counter and a bit later, it can be unplugged (from the wall outlet) and placed on a dining room table. The vessel 100 further provides a root basket 162 within the vase 102 to cut and hold a certain portion or amount of roots 166 or stems of plan applications 132 so that only a particularly desired amount or length of roots 166 and/or stems can be suspended or submerged into the oxygenated water provided within adjustable root basket 162 at or near the bottom of the vase 102. The root basket 162 may be made of or include a holed surface 164 including a mesh or a grid, such as an aluminum wire mesh or a plastic grid, or the like, and is placed at the lower end of the vase 102 and/or hanged from the top of the vase 102 or vessel 100. The vessel 100 may further provide one or more windows 172 at different locations on the wall of the vessel 100 to be used to check on the water level or plant health or growth, etc.

In one embodiment, the various components, such as vase 102, air pump 112, power supply 152, air diffuser 122, etc., collectively form the novel aeration mechanism to provide vital nutrients (e.g., oxygenated air, proper circulation of oxygenated water, other growth and sustenance nutrients, etc.) for plant applications 132, such as flowers, plants, trees, aquatic water life, etc. Using the aeration mechanism, not only the plant applications 132, such as cut flowers, are kept alive longer, but also, in several cases, new and existing roots 166 are promoted with sustained growth such that the flowers can be later planted in soil or with proper nutrients continue their growth in the vessel 100. In one embodiment, the aeration mechanism extends the life of and grows the plant applications 132 hydroponically (through deep water culture, aeroponically, etc.). In one embodiment, the vessel 100 is provided for growing plant applications 132 in a self-contained solution of adequate oxygen to maintain and promote extended life and propagation of plant applications 132.

In other words, and as aforementioned, the vessel 100 employing the aeration mechanism provides for a method for extending plant life of various plant applications 132 and propagation of as well as hydroponic growing of plant applications 132 that transplants living plant applications 132 into the vessel 100 of oxygenated water such that the cut stems or roots 166 of the plant applications 132 are submerged in oxygenated water provided by the vessel 100 without having to perform the conventional technique of merely filling a vase with regular water to water the roots 166 or base of a plant where the water quickly turns stagnate and ends the life of the plant.

Figure 2:
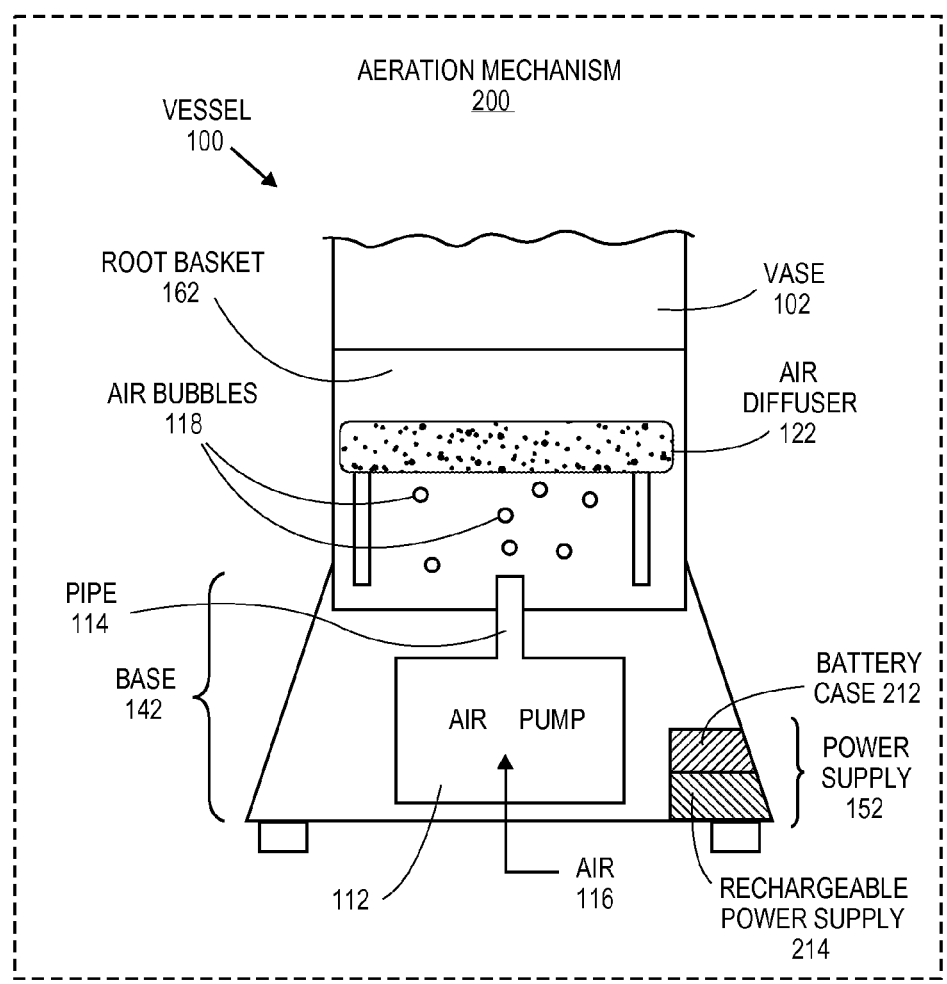
FIG. 2 illustrates a section of a vessel illustrating various components of an aeration mechanism.

FIG. 2 illustrates a section of a vessel illustrating various components of an aeration mechanism. In one embodiment, aeration mechanism 200 provides for a vessel 100 for propagation of and hydroponic growing of plant applications comprising a base 142 that houses an air pump 112 to adequately supply the necessary amount of oxygen 116 to plant applications within the vase 102. The air pump 112 contains an opening in the shape of a pipe 114 to allow the air 116 to enter the vase 102. The base 142 further employs an air diffuser 122 (e.g., a plastic disc with holes, an air stone that is similar to the ones used in fish tanks) to evenly distribute the air 116 within the vase 102 so that plant applications within the vase 102 can receive a sufficient supply of properly oxygenated water. The aeration 200 further provides a root basket 162 within the vase 102 to cut and hold a certain portion of roots or stems of a plan plant application so that only a particularly desired amount or length of roots and/or stems be suspended or submerged into the oxygenated water provided within the root basket 162 at the bottom or near bottom of the vase 102. The root basket 162 may be made of aluminum wire mesh or a plastic grid, or the like, such as surface 164 of FIG. 1, and is placed at the lower end of the vase 102 and/or hanged from the top of the vase 102 or vessel 100. The vessel 100 may further provide one or more windows 172 at different locations on the wall of the vessel 100 to be used to check on the water level or plant health or growth, etc.

The base 142 further includes a power supply 152 to supply sufficient power to the vessel 100 so that the aeration mechanism 200 may work within the vessel 100. The power supply 152 may include a battery case 152 to hold any number of batteries (e.g., two AA batteries, one 9-volt battery, etc.) and/or an electrical rechargeable power supply 214 that can be charged and recharged using an electric plugin system (e.g., a rechargeable power supply system used in mobile phones, electric razors, etc.). It is contemplated that the components 102, 112, 122, 142, 152 and 162 and their sub-components 212, 214 described here as part of the aeration mechanism 200 are not limited to be placed at the locations illustrated here. For example, the power supply 152 shown at the bottom right side of the base 142 may be alternatively placed on the top right side of the base 142 or it may not be part of the base 142 at all and be placed elsewhere, such as it is made part of the vase 102 or the like. Further, the vessel 100 is not limited to the components 102, 112, 122, 142, 152 and 162 or sub-components 212, 214 shown here and that any number and type of components may be employed or removed.

In one embodiment, the vessel 100 is constructed such that it is blocked from and not permeable to photo-radiation that could interfere with plant growth or promote growth of unwanted organisms, such as algae. As referenced throughout the document, "hydroponic" refers to a plant growing technique that does not use soil because, for example, the soil can contain bacteria, fungus, insects, etc., that can ruin the plant roots or stem and consequently, the plant itself. Similarly, the term "optimal growth" refers to plant growth that is optimized to achieve a selected set of characteristics, such as fruit harvest, root harvest, leaf harvest, flower production, size, longevity, etc. The vessel 100 and the aeration mechanism 200 provide optimal plant growth of plant applications. The term "growing a plant" or "plant growth" refers to the process which takes place when appropriate conditions, such as oxygenated water, photo-radiation, gas containing oxygen and carbon dioxide, and other necessary nutrients are provided to a plant tissue (such as a seed, a cutting, a transplant, a bulb, a tuber, a runner, plant roots, etc.), resulting in an increase in the mass of plant tissue. The word "cutting" as used herein refers to plant tissue with or without roots taken from an already existing plant.

Figure 3:
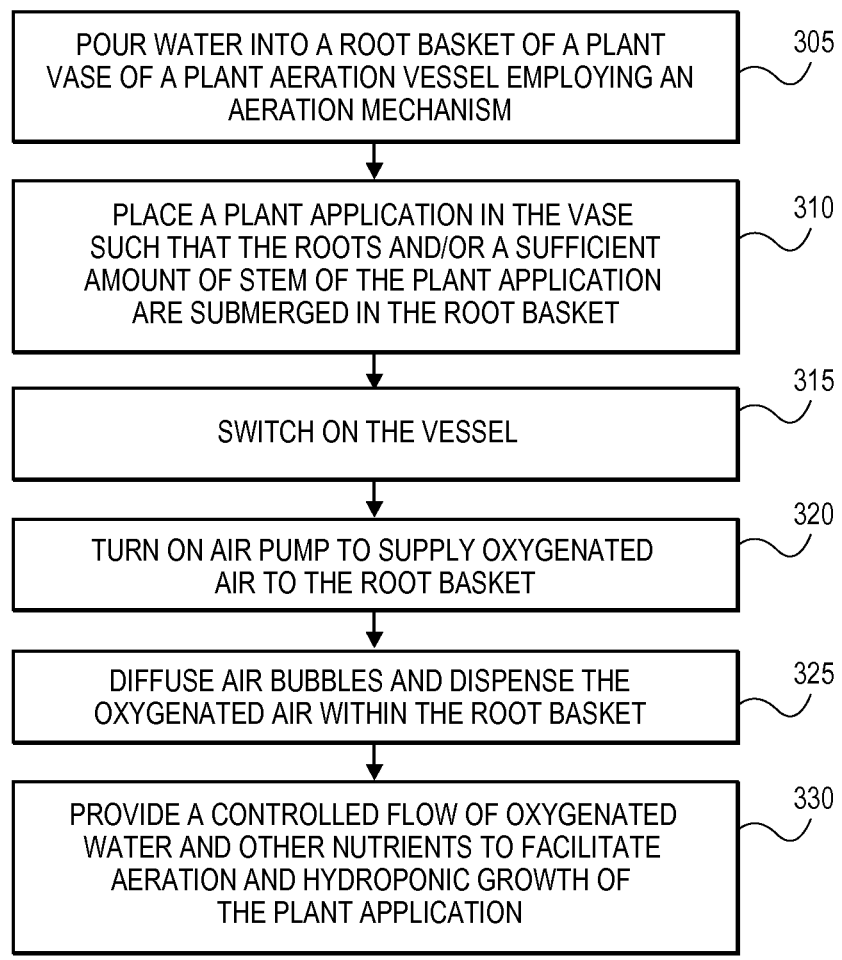
FIG. 3 illustrates a method for aerating of plant applications according to one embodiment of the invention.

FIG. 3 illustrates a method for aerating of plant applications according to one embodiment of the invention. Method 300 may be performed by processing logic provided by a combination of a vessel and an aeration mechanism employed by the vessel as illustrated with respect to FIGS. 1 and 2.

Method 300 begins at block 305 with pouring water into a root basket of a vase of a plant aeration vessel having employing an aeration mechanism. At block 310, a plant application (e.g., cut flowers, plants, trees, etc.) is placed in the vase such that the roots and/or a sufficient amount of stem of the plant application are submerged in the root basket having water. At block 315, the vessel is switched on. In one embodiment, the vessel may be equipped with a rechargeable power supply system that can be plugged into a wall socket, and a battery packet serving as a backup.

At block 320, in one embodiment, as the vessel gets switched on, an air pump (e.g., placed with the base of the vessel) gets turned on and begins to supply oxygenated air to the root basket having the roots and/or stem submerged in water. The air pump may include a pipe- or tube-like structure to properly pump air into the root basket. At block 325, any air bubbles resulting from the pumped air are dispersed or diffused using an air diffuser placed at the lower mouth of the root basket. This way, the air is properly supplied to the root basket without any air bubbles. At block 330, the roots and/or stem within the root basket are provided a controlled flow of oxygenated water along with other necessary nutrients for proper aeration and hydroponic growth of the plant application within the vase of the vessel.

As referred to throughout the document, in one embodiment, a plant vessel serves as a "machine" and it is contemplated that like any machine, it may include any number of components, sub-components, or even smaller machines or the vessel may be coupled with other machines to perform or more efficiently perform its functions. In one embodiment, the vessel may include a processor or a processing device which may represent one or more general-purpose processing devices (such as a microprocessor, central processing unit, etc.) and more particularly, the processing device may be complex instruction set computing (CISC) microprocessor, reduced instruction set computer (RISC) microprocessor, very long instruction word (VLIW) microprocessor, or a processing device implementing other instruction sets or a combination of instruction sets. Processing device may also be one or more special-purpose processing devices (e.g., an application specific integrated circuit (ASIC), a field programmable gate array (FPGA), a digital signal processor (DSP), a microprocessor, a network processor, etc.). In one embodiment, processing device is configured to execute the processing logic (e.g., aeration mechanism processing logic) for performing the operations and methods discussed herein and as performed by the vessel and the aeration mechanism of the vessel as referred to in FIGS. 1-2.

Having a processing device may further include coupling the processing device with a main memory (e.g., read-only memory (ROM), flash memory, random access memory (RAM), dynamic RAM (DRAM), synchronous DRAM (SDRAM), etc.), a static memory (e.g., flash memory, static random access memory (SRAM), etc.), and other storage devices (e.g., a data storage device or a magnetic disk or optical disc in the form of a drive unit, which may include fixed or removable machine-accessible or computer-readable storage medium), which communicate with each other via a bus. Storage 420 may include a non-transitory machine-accessible storage medium that may then be used to store one or more sets of instructions (e.g., aeration mechanism instructions). These instructions may be transmitted or received over a network via the network interface device coupled with a network (e.g., Internet). The instructions of the aeration mechanism of FIG. 2 may also reside, completely or at least partially, within the main memory and/or within the processing device as processing logic (e.g., aeration mechanism processing logic) during execution thereof by the computer system, the main memory and the processing device also constituting a non-transitory machine-readable storage media. Further, in one embodiment, the aeration mechanism, the printing device, or the aeration mechanism of FIG. 2 may be employed (entirely) on a single machine, such as the vessel of FIG. 1, or (partially or entirely) on different vessels.

While the non-transitory machine-accessible storage medium is described as a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

As aforementioned, in one embodiment, the plant vessel and its aeration mechanism are represented as and include modules, components and other features, as described throughout this document, can be implemented as discrete hardware components or integrated in the functionality of hardware components such as Application-Specific Integrated Circuit (ASIC), Field-Programmable Gate Array (FPGA), Digital Signal Processor (DSP), etc., or as software or as firmware or functional circuitry.

Throughout the foregoing description, for the purposes of explanation, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. An algorithm is here, and generally, conceived to be a self-consistent sequence of processes or steps leading to a desired result, and these processes or steps are those requiring physical manipulations of physical quantities manifesting as electrical or magnetic signals (e.g., bits, values, elements, symbols, characters, terms, numbers, etc.) capable of being stored, transferred, combined, compared, and otherwise manipulated. Further, terms (such as "supplying", "placing", "pouring", "communicating", "processing", "generating", "transforming", "turning", "receiving", "directing", "detecting", etc.) may be associated with various physical quantities and refer to action or processes or steps of processing logic of a processing device, such as the processing device, of a data processing device, such as the computer system.

It is contemplated that apparatus may be specially constructed for the required purposes, or it may comprise a general purpose computer selectively activated or reconfigured by a computer program stored in the computer. Such a computer program may be stored in a non-transitory machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus. However, it is further contemplated that methods (e.g., algorithms, processes, steps, etc.) and displays presented herein are not inherently related to any particular computer system or apparatus. Various general purpose systems may be used with programs in accordance with the teachings herein, or it may prove convenient to construct more specialized apparatus to perform the required method steps. Moreover, the present invention is not described with reference to any particular programming language or operating system or software platform. For example, it is appreciated that a variety of programming languages may be used to implement the teachings of the invention as described herein.

As aforementioned, embodiments of the present invention may be provided as a computer program product, or software, that may include a non-transitory machine-readable medium having stored thereon instructions, which may be used to program a computer system (or other electronic devices) to perform a process according to the present invention. A machine-readable medium includes any mechanism for storing or transmitting information in a form readable by a machine (e.g., a plant vessel, a computer system within the plant vessel). For example, a non-transitory machine-readable (e.g., a non-transitory computer-readable) medium includes a machine (e.g., a computer, a plant vessel having a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "X" is coupled to or with element "Y," element X may be directly coupled to element Y or be indirectly coupled through, for example, element "Z". When the specification or claims state that a component, feature, structure, process, or characteristic X "causes" a component, feature, structure, process, or characteristic Y, it means that "X" is at least a partial cause of "Y" but that there may also be at least one other component, feature, structure, process, or characteristic that assists in causing "Y." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements. Further, an embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

Any of the above embodiments may be used alone or together with one another in any combination. One or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
supplying, via an air pump of a plant vessel, oxygenated air to a plant within a section of a plant vase that is part of the plant vessel, the plant vase having one or more windows, wherein the section includes roots or lower cut stems of the plant submerged in water in a root basket that is part of the plant vessel, wherein the root basket includes a mesh surface to facilitate flow of the oxygenated air; and
evenly distributing, via an air diffuser of the plant vessel, the oxygenated air to the roots of the plant to facilitate hydroponic growth of the plant, wherein components of the plant vessel are placed in a direct linear arrangement, the components comprising the plant vase, the root basket at a lower end of the plant vase and having the air diffuser, and a base having the air pump and a power supply.

2. The method of claim 1, further comprising powering the plant vessel to facilitate supplying and distributing, wherein powering is performed using the power supply including a rechargeable power supply or a battery pack.

3. The method of claim 1, wherein the air diffuser comprises a plate having holes to evenly distribute the oxygenated air by diffusing air bubbles of the oxygenated air, wherein the air diffuser includes a holed round plate or a holed air stone hose.

4. The method of claim 1, further comprising turning the water into oxygenated water by adding the oxygenated air to the water, and providing a controlled flow of the oxygenated water and necessary growth nutrients to the plant.

5. The method of claim 1, further comprising stimulating growth of the roots up to a sufficient length, and removing the plant having the roots grown to the sufficient length, and planting or replanting the plant into soil for natural growth, wherein the plant includes one or more of a full plant, a full flower, a tree, and an aquatic water life plant, wherein the root basket is adjustable to accommodate a changing size of the plant or the roots, wherein the plant vessel includes a single encompassing chamber including the plant vase and the root basket.

6. The method of claim 1, wherein the plant comprises a cut plant without roots that is placed in the plant vase, and further comprising stimulating growth of new roots of the cut plant, and removing the cut plant when the new roots reach a sufficient length, and planting or replanting the cut plant into soil for natural growth, wherein the cut plant further includes a cut flower without roots or a cut tree without roots.

7. The method of claim 1, wherein the mesh surface comprises a holed surface, wherein the holed surface includes at least one of a net-like surface having a wired mesh and a grid-like surface having a grid of cavities.

8. A system comprising:
a plant vessel including:
an air pump to supply oxygenated air to a plant within a section of a plant vase that is part of the plant vessel, the plant vase having one or more windows, wherein the section includes a root basket having roots or lower cut stems of the plant that are submerged in water, the root basket further including a mesh surface to facilitate flow of the oxygenated air and an air diffuser evenly distributing oxygenated air to the roots of the plant to facilitate hydroponic growth of the plant;
wherein the plant vessel has a direct linear arrangement comprising the plant vase, the root basket at a lower end of the plant vase and having the air diffuser, and a base having the air pump and a power supply.

9. The system of claim 8, wherein the power supply supplies and distributes power to the plant vessel, the power supply including a rechargeable power supply or a battery pack.

10. The system of claim 8, wherein the air diffuser comprises a plate having holes to evenly distribute the oxygenated air by diffusing air bubbles of the oxygenated air, wherein the air diffuser includes a holed round plate or a holed air stone hose.

11. The system of claim 8, wherein the oxygenated air is added to the water to convert the water into oxygenated water, and a controlled flow of the oxygenated water and necessary growth nutrients are provided to the plant.

12. The system of claim 8, wherein the mechanism is further to stimulate growth of the roots up to a sufficient length, and removing the plant having the roots grown to the sufficient length, and planting or replanting the plant into soil for natural growth, wherein the plant includes one or more of a full plant, a full flower, a tree, and an aquatic water life plant, wherein the root basket is adjustable to accommodate a changing size of the plant or the roots, wherein the plant vessel includes a single encompassing chamber including the plant vase and the root basket.

13. The system of claim 8, wherein the plant comprises a cut plant without roots that is placed in the plant vase, and the one or more operations further include stimulating growth of new roots of the cut plant, and removing the cut plant when the new roots reach a sufficient length, and planting or replanting the cut plant into soil for natural growth, wherein the cut plant further includes a cut flower without roots or a cut tree without roots.

14. The system of claim 8, wherein the mesh surface comprises a holed surface, wherein the holed surface includes at least one of a net-like surface having a wired mesh and a grid-like surface having a grid of cavities.

15. An apparatus comprising:
an air pump of a plant vessel, the air pump capable of supplying oxygenated air to a plant within a section of a plant vase that is part of the plant vessel, the plant vase having one or more windows, wherein the section includes roots or lower cut stems of the plant submerged in water in a root basket that is part of the plant vessel, wherein the root basket includes a mesh surface to facilitate flow of the oxygenated air; and
an air diffuser, coupled to the air pump, to evenly distribute the oxygenated air to the roots of the plant to facilitate hydroponic growth of the plant, wherein components of the plant vessel are placed in a direct linear arrangement, the components comprising the plant vase, the root basket placed at a lower end of the plant vase and having the air diffuser, and a base having the air pump and a power supply.

16. The apparatus of claim 15, wherein the power supply supplies and distributes power to the plant vessel, the power supply including a rechargeable power supply or a battery pack.

17. The apparatus of claim 15, wherein the air diffuser comprises a plate having holes to diffuse air bubbles of the oxygenated air to evenly distribute the oxygenated air, wherein the plant vessel is further to add the oxygenated air to the water to turn the water into oxygenated water, wherein the plant vessel is further to facilitate a controlled flow of the oxygenated water and necessary growth nutrients to the plant, wherein the air diffuser includes a holed plate or a holed air stone hose.

18. The apparatus of claim 15, wherein the roots are stimulated to grow up to a sufficient length, and wherein the plant having the roots grown to the sufficient length is removed and planted or replanted into soil for natural growth, wherein the plant includes one or more of a full plant, a full flower, a tree, and an aquatic water life plant, wherein the root basket is adjustable to accommodate a changing size of the plant or the roots, wherein the plant vessel includes a single encompassing chamber including the plant vase and the root basket.

19. The apparatus of claim 15, wherein the plant comprises a cut plant without roots that is placed in the plant vase, and wherein the cut plant is stimulated to grow new roots to a sufficient length, and wherein the cut plant having the new roots grown to the sufficient length is removed and planted or replanted into soil for natural growth, wherein the cut plant further includes a cut flower without roots or a cut tree without roots.

20. The apparatus of claim 15, wherein the mesh surface comprises a holed surface, wherein the holed surface includes a net-like surface having a wired mesh and a grid-like surface having a grid of cavities.

* * * * *